(12) United States Patent
Charlemagne et al.

(10) Patent No.: US 9,599,023 B2
(45) Date of Patent: Mar. 21, 2017

(54) VENTILATION OF AN ACCESSORY GEAR BOX, AND TURBOJET ENGINE COMPRISING SUCH A GEAR BOX

(75) Inventors: Pierrick Charlemagne, Montreuil Sous Bois (FR); Gerard Philippe Gauthier, Champagne sur Seine (FR)

(73) Assignee: SNECMA, Paris (FR)

( * ) Notice: Subject to any disclaimer, the term of this patent is extended or adjusted under 35 U.S.C. 154(b) by 593 days.

(21) Appl. No.: 14/127,387

(22) PCT Filed: Jun. 21, 2012

(86) PCT No.: PCT/FR2012/051422
§ 371 (c)(1),
(2), (4) Date: Dec. 18, 2013

(87) PCT Pub. No.: WO2012/175883
PCT Pub. Date: Dec. 27, 2012

(65) Prior Publication Data
US 2014/0116064 A1      May 1, 2014

(30) Foreign Application Priority Data

Jun. 22, 2011 (FR) ...................................... 11 55520

(51) Int. Cl.
*F02C 7/36* (2006.01)
*F01D 25/12* (2006.01)
(Continued)

(52) U.S. Cl.
CPC ................ *F02C 7/36* (2013.01); *F01D 25/12* (2013.01); *F02C 7/18* (2013.01); *F02C 7/32* (2013.01);
(Continued)

(58) Field of Classification Search
CPC .. F02C 3/113; F02C 3/107; F02C 7/36; F02C 7/24; F02C 7/32; F05D 2260/4031;
(Continued)

(56) References Cited

U.S. PATENT DOCUMENTS 3,965,673 A   6/1976   Friedrich
5,125,597 A   6/1992   Coffinberry
(Continued)

FOREIGN PATENT DOCUMENTS

EP           0 459 816    12/1991

OTHER PUBLICATIONS

International Search Report Issued Oct. 8, 2012 in PCT/FR12/051422 Filed Jun. 21, 2012.

*Primary Examiner* — Steven Sutherland
*Assistant Examiner* — Stefan Ibroni
(74) *Attorney, Agent, or Firm* — Oblon, McClelland, Maier & Neustadt, L.L.P.

(57) ABSTRACT

An accessory gear box configured to be mounted on a fan casing of a turbojet engine, including: an input shaft; a plurality of accessory drive shafts; and a compartment forming an interface with an accessory arranged on the housing of the accessory gear box at a site of the accessory, the interface compartment including an inlet and an outlet configured to allow air to circulate inside the compartment, to insulate the accessory gear box from heat generated by the accessories.

10 Claims, 2 Drawing Sheets

(51) Int. Cl.
    *F02C 7/32*        (2006.01)
    *F02K 3/06*        (2006.01)
    *F02C 7/18*        (2006.01)

(52) U.S. Cl.
    CPC ........ *F02K 3/06* (2013.01); *F05D 2260/4031* (2013.01); *Y02T 50/675* (2013.01)

(58) Field of Classification Search
    CPC ....... F05D 2260/40311; Y10T 74/2186; Y10T 74/2189; F01D 25/12; F16H 57/0415; F16H 57/0416
    See application file for complete search history.

(56) References Cited

U.S. PATENT DOCUMENTS

| | | | | |
|---|---|---|---|---|
| 5,402,631 | A * | 4/1995 | Wulf | F02C 3/107 415/66 |
| 2006/0260323 | A1 | 11/2006 | Moulebhar | |
| 2009/0302152 | A1* | 12/2009 | Knight | B64D 41/00 244/58 |
| 2010/0300117 | A1 | 12/2010 | Moulebhar | |

* cited by examiner

VENTILATION OF AN ACCESSORY GEAR BOX, AND TURBOJET ENGINE COMPRISING SUCH A GEAR BOX

BACKGROUND OF THE INVENTION

Field of the Invention

The present invention relates to turbojet engines and, more particularly, to their accessory gear box, generally known as "Accessory Gear Box" (AGB).

Description of the Related Art

Some of the power generated by a turbojet engine is used to supply energy to various items of its equipment. This power is mechanically obtained from the shaft of the high pressure (HP) spool of the turbojet engine by a power take-off shaft which drives an input shaft in the accessory gear box. This housing contains a certain number of gears connected to items of equipment or accessories, such as, for example, an electric generator, a starter, an alternator, hydraulic pumps for fuel or oil, etc. These various accessories are mechanically driven by the AGB input shaft which, via the gears of the AGB, transfers some of the power obtained from the HP shaft to each of them.

The AGB generally comprises a cylindrical housing, made of an aluminium alloy casting closed at the top and bottom by two substantially parallel walls, thus defining a housing to accommodate the gear-wheels that drive the accessories. Each gear-wheel comprises a shaft able to accommodate the drive shaft of an accessory and one of said gear-wheels is also connected to the AGB input shaft. The various accessories driven by the AGB are mounted directly on the cast housing, the drive shafts of these accessories passing through cutouts made in one of the walls of this housing to drive them and dimensioned so as to allow the corresponding gear wheel to be mounted inside the housing. The gear wheels are positioned in the cast housing so that they are supported on one side by the housing wall opposite the cutout for its drive shaft and, on the other, by a removable cover which attaches to the slotted wall of the housing. As a general rule, although this configuration is not essential, the gear wheel shaft is supported by the outer ring of a roller bearing attached to the uncut bottom wall of the housing and by the outer ring of a ball bearing attached to the cover associated with said accessory.

In a multi-flow turbojet engine the accessory gear box is generally mounted on the fan casing inside the fan compartment in the space delimited by the fan casing on the inside and the nacelle on the outside. It is shaped to fit the curve of the fan compartment, the drive shafts of the accessory machines being oriented along the engine axis. The power take-off shaft on the HP rotor driving the input shaft of the gear box is arranged inside one of the arms of the intermediate casing to which the fan casing is attached.

The hydraulic pumps connected to the accessory gear box constantly rotate while the engine is running and there is no provision for being able to disconnect them. When the pump is inactive, this rotation is only accompanied by minimal circulation of hydraulic fluid, just sufficient to renew it; it therefore creates a significant amount of heat which transfers via conduction to the gear box, which is already at a temperature close to the specified limits.

It would be desirable to prevent the accessory gear box having to absorb this additional power.

It would also be desirable to be able to ventilate the fan compartment while the aircraft is standing still with the engine running.

A proposed solution was to install an insulating material between the accessory and the gear box housing. This insulation serves to reduce the interface temperature for the equipment but does not dissipate the heat. Moreover, the simple insulation solution creates a temperature gradient between the equipment and the gear box if the equipment is colder than said gear box. However, if the equipment itself dissipates the energy that should be evacuated, the insulation only serves to limit the flow of heat via conduction to the accessory gear box and the temperature of the equipment increases until it eventually exceeds the permitted threshold.

BRIEF SUMMARY OF THE INVENTION

The invention resolves this problem by means of an accessory gear box suitable for being mounted on the fan casing of a turbojet engine, comprising an input shaft and a plurality of housings for accessory drive shafts, characterised in that a compartment able to form an interface with an accessory is arranged on the housing of the accessory gear box at the site of said accessory, the said interface compartment comprising an inlet and an outlet, the two openings being arranged so as to allow air to circulate inside the interface compartment to insulate the accessory gear box from the heat generated by the accessories.

The arrangement of such an interface compartment effectively and actively insulates the accessory generating the heat from the accessory gear box.

Where the problem concerns the hydraulic pumps, the site at which the interface compartment is arranged is that of the hydraulic pump.

In an advantageous embodiment, the interface compartment comprises a blower circulating air between said air inlet and outlet openings. This blower is preferably arranged so that it is driven by the drive shaft of the accessory concerned.

Where there are at least two heat-generating accessories, the accessory gear box comprises a second interface compartment at a second accessory site. In this case, it is expedient to ventilate the whole assembly by providing a communication, for example via a pipe, between the inlet of one interface compartment and the outlet of the other interface compartment.

To improve the insulation system even further, the interface compartment comprises at least one wall made of thermally insulating material on the side where the accessory or the gear box is installed. This avoids parasitic heating of the circulating ventilation air.

The invention also relates to a multi-flow turbojet engine comprising a fan and an accessory gear box installed inside the fan compartment arranged between the fan casing and the nacelle surrounding the fan, characterised in that the interface compartment communicates via one of the said openings with the air outside the fan compartment and via the other with the air inside the fan compartment.

In this way the air ventilating the interface compartment is used to ventilate the fan compartment, even when the aircraft is on the ground, at standstill with the engine running. This solution is particularly advantageous when the accessory concerned is a hydraulic pump.

More particularly, when the accessory gear box comprises at least two accessories, each with an interface compartment, one of the compartments comprises a blower, communicating via an opening with the other interface compartment.

BRIEF DESCRIPTION OF THE SEVERAL VIEWS OF THE DRAWINGS

The following detailed explanatory description of an embodiment of the invention, given by way of an illustrative and non-limiting example and with reference to the attached schematic drawings, will provide a better understanding of the invention and better illustrate other applications, details, characteristics and advantages of it.

In these drawings.

DETAILED DESCRIPTION OF THE INVENTION

Figure 1:
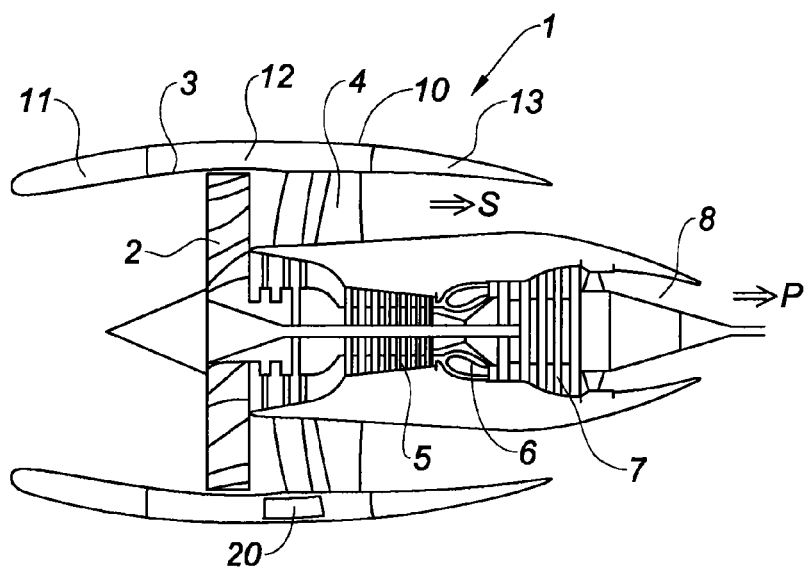
FIG. 1 shows an axial section through a dual-flow engine.

FIG. 1 shows the elements that conventionally make up a turbojet engine 1 with separate flows. From left to right this comprises a fan 2; the compressed air flow is divided into two concentric flows, the inner primary flow P and a secondary flow S outside said primary flow. The primary flow is directed inside the engine where it is re-compressed by the compressor 5. It supplies the combustion chamber 6 where it is mixed with fuel and burnt. The hot gases are diffused in different turbine stages 7, one of which drives the high-pressure compressor 5 and the other the low-pressure compressor with the fan 2. The primary flow is discharged through the primary flow nozzle 8. The secondary flow downstream of the fan 2 is directed via the secondary flow path, between the internal radial wall formed by the primary flow duct and the outer radial wall formed by the fan casing 3 and the collar of the intermediate casing 4 and then discharged through the secondary flow nozzle.

The nacelle 10 that surrounds the fan comprises an air intake duct 11, a middle portion, forming a compartment 12 with the fan casing, and the secondary flow exhaust nozzle 13 associated with a flow reverser.

The engine comprises an accessory gear box on which the accessories required to operate the engine are mounted and driven: electric generator, starter, alternator, hydraulic pumps for fuel and oil.

In the conventional manner for this type of engine, the accessory gear box 20 is attached to the fan casing 3 level with the arm of the intermediate casing 4 which houses the power take-off shaft to drive the gears contained in the accessory gear box housing.

FIGS. 2 to 5 schematically show the arrangement of the accessory gear box 20.

Figure 2:
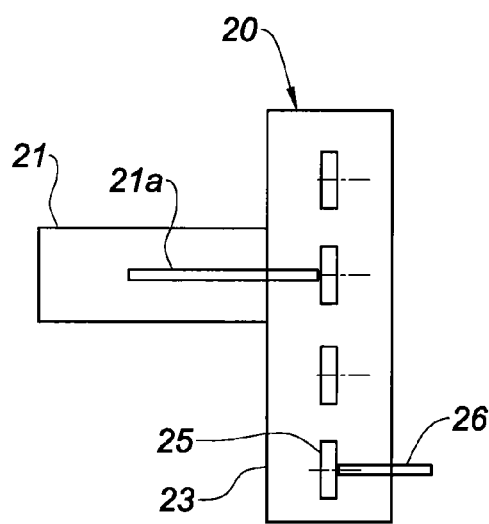
FIG. 2 schematically represents the arrangement of an accessory gear box from the prior art.

In FIG. 2, an accessory 21 is mounted on the housing 23 of the gear box 20, in accordance with the prior art. It is attached by any removable means that allows it to be mounted and dismounted. Inside the housing there are various gear wheels 25, which are moved by the motor shaft 26, which is in turn driven by the power take-off shaft mentioned above. The accessory 21 is driven by a shaft 21a that passes through the cover of the housing 23 of the gear box 20 and is connected to one of the gear wheels contained in the housing 23. In the prior art the interface between the accessory 21 and the gear box comprises the housing cover and the site on the cover arranged to accommodate it with the appropriate means of attachment. It was proposed to position an insulating material at this interface. However, this solution was not sufficient for heat-generating equipment, such as a hydraulic pump, which heats up when the flow of hydraulic fluid is low, as is the case when the pump is not in use.

Figure 3:
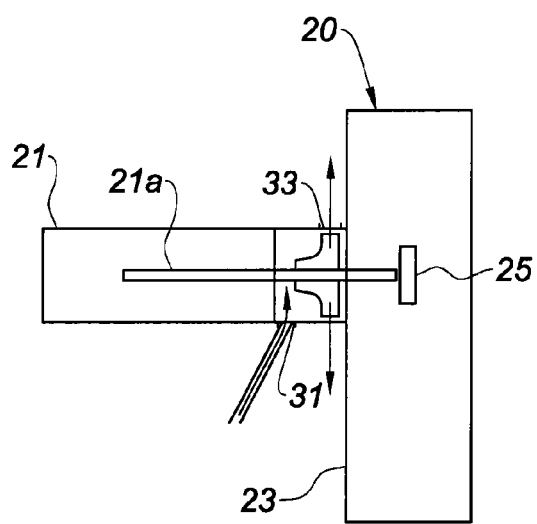
FIG. 3 schematically represents the solution according to the invention adapted to the accessory gear box in FIG. 2.
Figure 4:
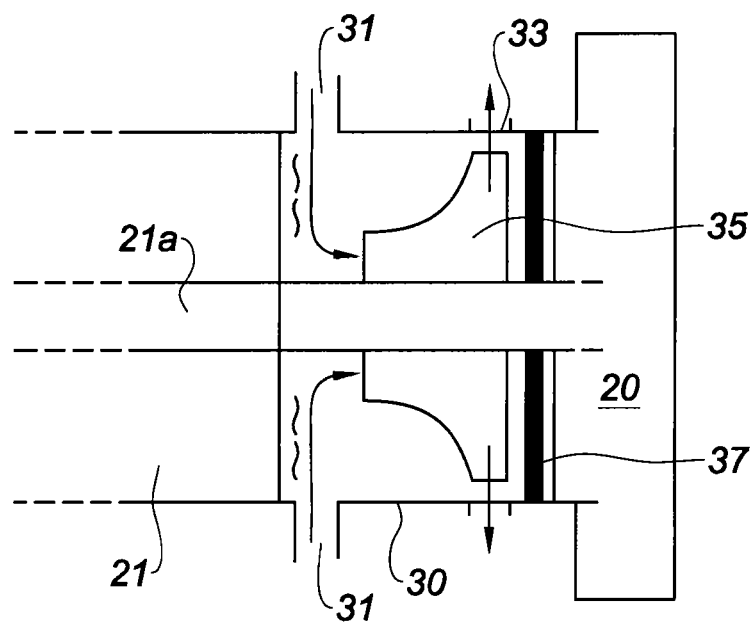
FIG. 4 shows the arrangement according to the invention in FIG. 3 in more detail.

FIGS. 3 and 4 show the solution according to the invention. Parts that have not been modified bear the same reference. An interface compartment 30 has been arranged between the gear box and the accessory 21. It may take the form of a patch arranged on the cover of the housing of the accessory gear box 20, the equipment being attached to said patch. The shaft 21a passes through this compartment 30, which comprises two openings, 31 and 33, connecting it to the outside. The opening 31 is on the side of, and close to, the accessory 21, the opening 33 extends over the periphery of the interface compartment, on the side of the accessory gear box 20. Inside the interface compartment 30, a blower 35 is mounted on the drive shaft 21a of the accessory 21. Here the blower is centrifugal with axial inlet and radial exhaust. The axial inlet of the blower is turned towards the accessory 21; the radial exhaust is on the side of the accessory gear box cover. The opening 31 is connected via a pipe to the atmosphere outside the engine's fan compartment 12. The opening 33 is opposite the radial exhaust of the blower 35. In a preferred version, a plate 37 made of insulating material is placed between the compartment 30 and the cover of the accessory gear box.

This device operates as follows. When the turbojet engine is running, it drives the equipment mounted on the accessory gear box 20, including the accessory 21. More specifically, this accessory is a hydraulic pump. As it drives the moving parts of the accessory 21, the shaft 21a rotates the blower 35 around its axis and said blower sucks in air from outside the compartment through the inlet 31; the air sweeps the wall of the accessory 21 and exchanges heat with it. The ventilation air is then compressed by the blower which vents it through the peripheral opening 33 in the fan compartment 12. This serves to evacuate the heat generated by the accessory and to ventilate the fan compartment. The insulating plate 37 completes the protection of the gear box against heating due to the accessory 21.

Figure 5:
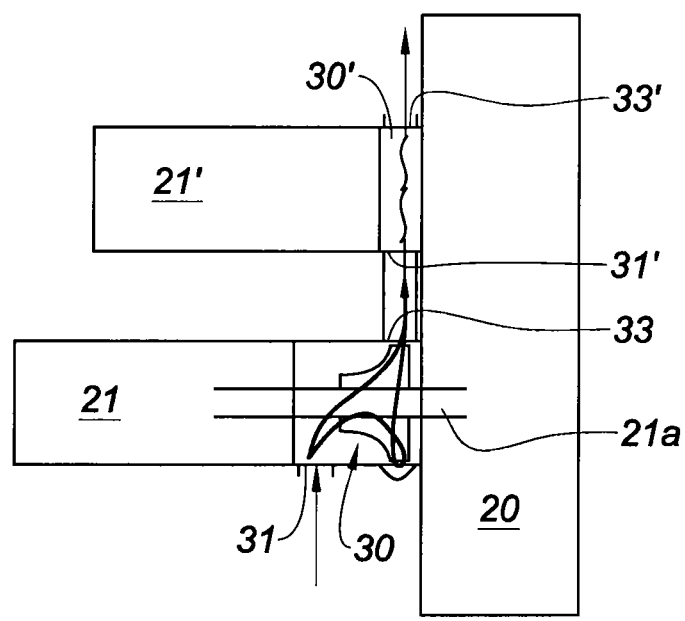
FIG. 5 shows a variation of the solution according to the invention.

According to a variation shown in FIG. 5, the protective effect of two interface compartments is combined. A second accessory 21' is provided with an interface compartment 30' interfacing with the accessory gear box 20. In this case a single blower is sufficient to ventilate the air through the interface compartments 30 and 30'. For example, the outlet 33 of the first interface compartment 30 is connected via a pipe to an inlet 31' of the second interface compartment 30'. The second opening 33' of the second interface compartment 30' communicates with the fan compartment 12.

According to another embodiment, instead of the second compartment 30' being arranged downstream of the first compartment 30, it is placed upstream of the first compartment. This achieves the same result.

The invention claimed is:

1. An accessory gear box configured to be mounted on a fan casing of a turbojet engine, comprising:
   an input shaft driven by a shaft of the turbojet engine;
   an accessory drive shaft; and
   an interface compartment forming an interface with an accessory arranged on a housing of the accessory gear box at a site of the accessory such that the interface compartment is sandwiched between and in direct contact with the accessory and the housing of the accessory gear box the interface compartment comprising an inlet and an outlet, the inlet and outlet configured to allow air to circulate inside the interface compartment to insulate the accessory gear box from heat generated by the accessory,
wherein the accessory drive shaft passes through the interface compartment.

2. An accessory gear box, according to claim 1, wherein the site of the accessory on the housing with the interface compartment is that of a hydraulic pump.

3. An accessory gear box, according to claim 1, wherein the interface compartment comprises a blower circulating air between the inlet and outlet.

4. An accessory gear box, according to claim 3, wherein the blower is configured to be driven by the accessory drive shaft.

5. An accessory gear box, according to claim 4, further comprising a second interface compartment at a site of a second accessory drive shaft.

6. An accessory gear box, according to claim 5, wherein the inlet of the interface compartment communicates with an outlet of the second interface compartment.

7. An accessory gear box, according to claim 1, wherein the interface compartment comprises at least one wall of thermally insulating material on a side on which the accessory or the accessory gear box is mounted.

8. A multi-flow turbojet engine comprising:
a fan; and
an accessory gear box comprising:
an input shaft;
a plurality of accessory drive shafts; and
an interface compartment forming an interface with an accessory arranged on a housing of the accessory gear box at a site of the accessory, the interface compartment comprising an inlet and an outlet, the inlet and outlet configured to allow air to circulate inside the interface compartment to insulate the accessory gear box from heat generated by the accessory, the accessory gear box being mounted on a casing of the fan inside a fan compartment arranged between the fan casing and a nacelle surrounding the fan,
wherein the interface compartment communicates via one of the inlet and the outlet with air outside the fan compartment and via the other of the inlet and the outlet with air inside the fan compartment.

9. A turbojet engine, according to claim 8, wherein the accessory gear box comprises first and second accessories each with an interface compartment, the interface compartment of the first accessory comprising a blower and communicating via an opening with the interface compartment of the second accessory.

10. A turbojet engine according to claim 8, wherein the interface compartment is mounted on a drive shaft of a hydraulic pump.

* * * * *